United States Patent [19]
Nguyen Van

[11] 3,889,165
[45] June 10, 1975

[54] LINEAR AND ROTARY ACTUATOR

[75] Inventor: Trong Nguyen Van, La-Celle-Saint-Cloud, France

[73] Assignee: La Telemecanique Electrique, Nanterre, France

[22] Filed: Jan. 31, 1974

[21] Appl. No.: 438,474

Related U.S. Application Data

[63] Continuation-in-part of Ser. No. 292,427, Sept. 21, 1972, abandoned.

[30] Foreign Application Priority Data
Sept. 28, 1971 France .............................. 71.34793

[52] U.S. Cl. .................................. 318/115; 310/12
[51] Int. Cl. ............................................. H02k 41/00
[58] Field of Search ................. 318/35, 115, 37, 38; 310/12–19

[56] References Cited
UNITED STATES PATENTS

| | | | |
|---|---|---|---|
| 3,394,295 | 7/1968 | Cory | 318/115 |
| 3,441,819 | 4/1969 | Palmero | 318/115 |
| 3,745,433 | 7/1973 | Kelly, Jr. et al. | 318/115 |

OTHER PUBLICATIONS

IBM Tech. Disclosure Bulletin, "Linear–Rotary Actuator and Transducer for Stick Printer," Meier, Vol. 16, No. 2, July, 1973.

*Primary Examiner*—Donovan F. Duggan
*Attorney, Agent, or Firm*—William Anthony Drucker

[57] ABSTRACT

Actuator equipped with variable-reluctance motors, characterized by a magnetic component which can move in rotation and having on a first part of its surface a first series of channels perpendicular to the axis of rotation and on a second part of its surface a second series of channels parallel to said axis, and coiled pole pieces comprising teeth whose pitch corresponds to that of the channels.

Applied to the construction of manipulators and to controlling the movements of machine tool components.

5 Claims, 5 Drawing Figures

LINEAR AND ROTARY ACTUATOR

This application is a continuation-in-part of application Ser. No. 292,427, filed Sept. 21, 1972, now abandoned.

The invention relates to an actuator equipped with variable reluctance motors of the type described in the copending U.S. patent application filed on Sept. 21, 1972, in the names of N'Guyen Van Trong and Louis Joseph Fechant, under Ser. No. 290,860 for "Linear Motor with Electromagnetic Control".

Such actuators are used in all applications where the space scanned by a single-motor actuator or its precision are not adequate.

They are particularly well suited to the construction of manipulators and to controlling movements of machine tool components.

Actuators or manipulators equipped with several motors, to each of which a particular function is assigned, are already known; for example, a first rotary motor to control the linear movement of the control component by means of a reduction box, a screw and a nut, and a second rotary motor to impart a certain angular position to the control component.

On the one hand, the use of pinions, screws and nuts inevitably introduces play, unless it is decided to use expensive ball circulations, and on the other hand the linear and angular positions cannot be known without the help of a coder.

The aim of the invention is to provide a neat solution to the problems mentioned above by having recourse, for equipping the instruments in question, to variable-reluctance motors which can be controlled step by step.

In accordance with the invention, this result is achieved by virtue of the fact that the movable component is in the form of a cylindrical revolving element made of a magnetic material and having on a first part of its surface a first series of channels the planes of which are substantially perpendicular to the axis of revolution, while on a second part of its surface there is a second series of channels substantially parallel to the same axis, magnetic pole pieces each subjected to the effect of a coil alternatingly traversed by a current and comprising teeth the pitch of which corresponds to that of the channels being arranged opposite said surfaces.

In accordance with a first embodiment, the two kinds of channels are arranged on the external surface of the cylinder and each occupies half the available surface.

In accordance with a second, particularly advantageous embodiment, the cylindrical element is of tubular form, and a first series of channels is provided for on the internal surface, while the second series is arranged on the external surface thereof. Other peculiarities and advantages of the invention will emerge clearly from a reading of the following description.

Figure 1:
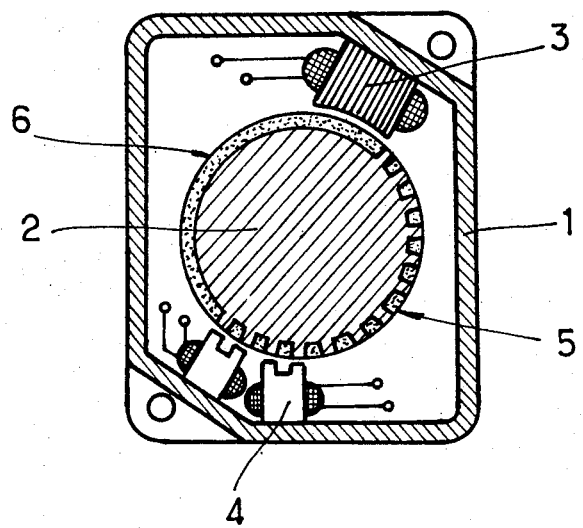
FIG. 1 shows an embodiment of the invention wherein the different kinds of channels are arranged on the external surface of the movable element.

Referring to FIG. 1, 1 designates the casing of the actuator and 2 designates the movable component, seen in section.

The movable component, cylindrical in shape, has two series of channels 5, 6 respectively, each occupying half the cylindrical surface and forming a series of teeth between them.

The first series of channels 6, whose plane is perpendicular to the axis, serves to form a set of teeth designed to cooperate with a set of pole pieces such as 3 to create a force or lock in an axial direction when the corresponding coils are energized. These teeth are fixed on the inside wall of the casing and are axially positioned one behind the other, with spacings the values of which are stated in the copending patent application mentioned above. Moreover, the second series of channels 5, whose planes pass through the axis of revolution or are parallel thereto, cooperates with a set of angularly disposed pole pieces such as 4, with a view to creating a tangential force (or in other words a torque) on the movable component.

All or part of the pole pieces can be arranged axially one behind the other, keeping a suitable spacing (see above); they can also be placed along the periphery of the movable component, but this arrangement causes a reduction of the effective travel.

In the embodiment illustrated in FIG. 1, it can be seen that the portions of surface appertaining to each series of channels and positioned opposite the pole pieces cover an angular portion which is about one-quarter of the angular portion over which each series of teeth extends.

This arrangement then enables the movable component to rotate up to three-eighths of a turn when the pole pieces 4 are sequentially excited by corresponding coils, while providing for part of the channels 6 still to remain opposite the pole pieces 3.

A mechanical stop, not shown, prevents the movable component from moving in rotation more than three-eigths of a turn and thereby running the risk of bringing in front of the pole pieces a series of channels with which no cooperation is possible.

If a locking force is applied to core 3 by simultaneously energizing the corresponding coils, any axial movement of the movable component 2 is prevented, but a partial rotation is still possible as the presence of an axial locking force does not modify the influence of core 4 upon the channel 5 when current is flowing through the corresponding coils.

As the channels can be filled with plastic, it is easy to provide the movable component in the external form of a revolving cylinder which can be passed through the sealing components of the casing without any break in continuity.

Figure 2:
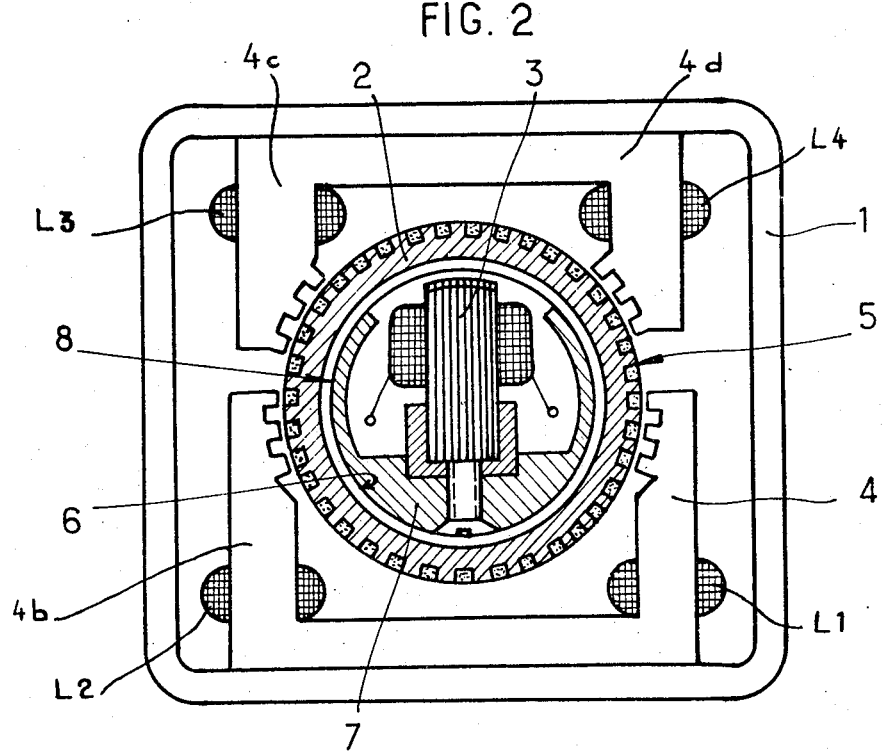
FIG. 2 illustrates an embodiment wherein one of the two series of channels is arranged inside the movable component.

The variant shown in FIG. 2 still stems from the same fundamental idea, but in this case it is the whole external surface of a cylinder 2 which comprises channels 5 the planes of which pass through the axis, so that it becomes possible to rotate the movable component through several turns, by virtue of the effect of the pole pieces $4a$, $4b$, $4c$, $4d$, the windings of which being shown at $L_1$, $L_2$, $L_3$, $L_4$ respectively.

The cylinder 2 is hollowed out and thus assumes a tubular aspect.

The whole of the inside cylindrical surface is in this case equipped with circular channels 6 the planes of which are perpendicular to the axis.

The cylindrical surface passing through the top of each circular tooth formed between two channels moreover serves to guide the movable element.

The guide means is here shown in the form of a skirt 8, fixed to a front wall of the casing 1, which has a portion of cylindrical surface whose external diameter corresponds to the internal diameter of the movable component and whose span is more than 180° and less than 360°C.

This guide skirt has a hollowed-out portion housing the pole pieces 3 for axial movement and a more solid part 7 where the latter are fixed.

The unit can also be cast by means of epoxy-type resins.

In another possible variant, which is not shown, the two portions of cylindrical surface, external or internal, each comprising the series of teeth and channels appropriate thereto, could be positioned one behind the other, in an axial direction.

Figure 4:
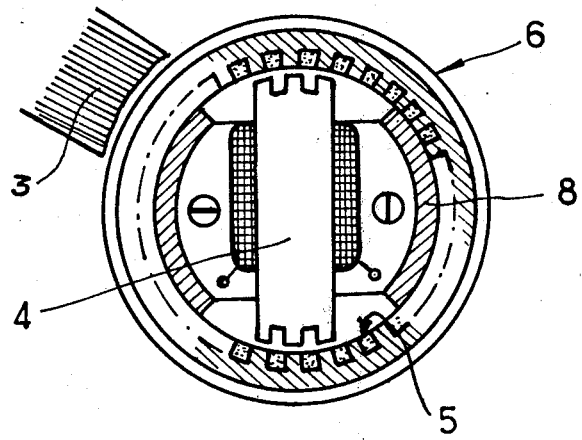
FIG. 4 shows an embodiment of pole pieces adapted to provide linear movements when these are arranged inside the movable component.

Another embodiment of the invention is shown in FIG. 4 wherein the channels 5 and the cooperating cores 4 are located inside a tubular movable element 2, whereas the channels 6 are located outside the same element.

The order of excitation of the pole pieces shown in FIG. 2 is clockwise. If we designate the windings corresponding to the pole pieces 4a, 4b, 4c and 4d by $L_1$, $L_2$, $L_3$ and $L_4$, it is sufficient if only $L_1$ and $L_2$ are traversed by a current flowing in the same direction but out of phase to a certain extent for one current polarity, and that $L_1$ and $L_2$ are subsequently traversed by a current in an analogous manner, but making use of a change of polarity in order to be able to utilize directly the alternative single phase sector.

Figure 5:
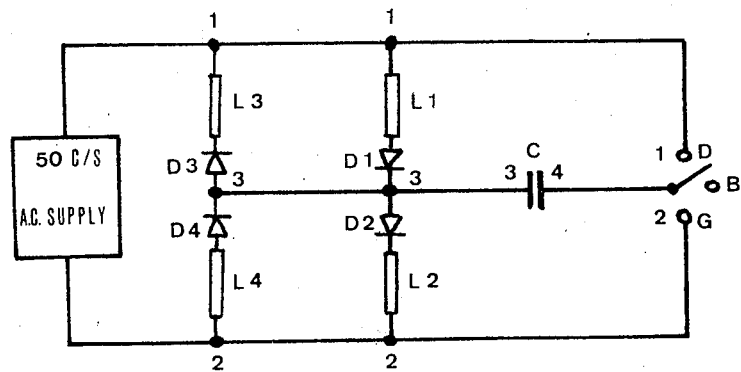
FIG. 5 shows an example of energizing circuit for the embodiment of FIG. 2.

An example of such an energizing circuit is shown in the diagram in FIG. 5.

Two leads, of which the potential is indicated by 1 and 2, are connected to the terminals of the 50 c/s supply. The following two sets of components are connected in parallel between these two leads:

1. the winding $L_3$, the diode D3, the diode D4, the winding $L_4$;
2. the winding $L_1$, the diode D1, the diode D2, the winding $L_2$.

The diodes D3 and D4 are arranged in such a way that a current can pass through them from the potential 2 towards the potential 1, while the diodes D1 and D2 are fitted in the reverse manner.

The points common to the two diodes in each branch are linked by a conductor of potential 3 terminating at one of the plates of a dephasing condenser C.

The second plate of the condenser is connected to the brush of potential 4 of a three-pole commutator, the end terminals of which are brought respectively to the potentials 1 and 2. The intermediate terminal is not connected to a specific potential and corresponds to a position of the reverser which does not involve the condenser C.

Assuming the brush of the reverser to be connected to the potential 2, it will be seen that when the potential 1 is positive in terms of 2, a current will flow first in $L_1$, D1 across C and then across C, D2 and $L_2$.

When the following alternation causes the lead 2 to be positive in terms of lead 1, the windings $L_3$ and $L_4$ will be excited in a similar way. In this case, the sliding element will move to the left.

If the brush of the reverser is connected to the terminal of potential 1, and if the potential is positive, current will flow in turn through the windings, but in a different order, viz., $L_2$, $L_1$, $L_4$ and $L_3$. The result will be a shift of the sliding element to the right.

The intermediate position of the brush of the reverser will give rise to the simultaneous flow of current first in $L_1$ and $L_2$ and then in $L_4$ and $L_3$. The various airgaps will thus not be acted upon in sequence, and the sliding element will retain a stable position from which it will not move unless a very large axial force is exerted on it. This position is thus that of blockage of the sliding element.

It is naturally possible to design more elaborate excitation circuits by making use of controlled semiconductor elements and by supplying the coils with direct current, but these systems are only justified by their flexibility in operation, their high output and the fact that they are generally associated with a variable speed control.

Figure 3:
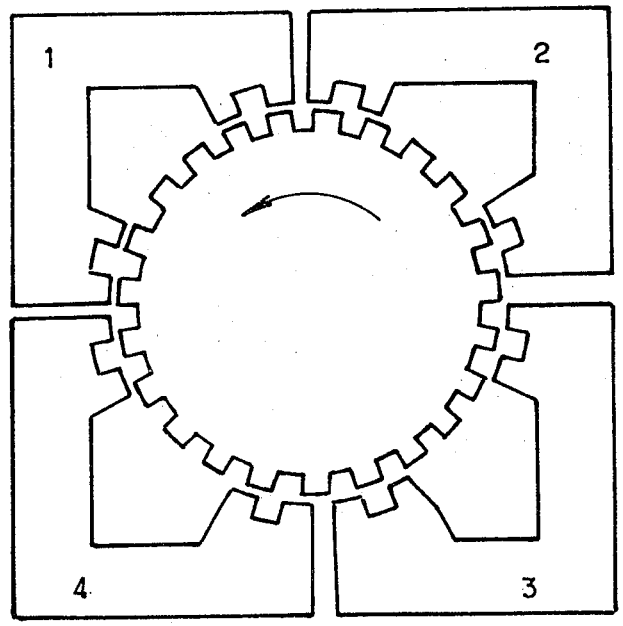
FIG. 3 shows an embodiment allowing a single type of pole piece to be used to control the rotation.

FIG. 3 shows how the pole pieces of the type designated by reference numeral 4 in FIG. 2 can be embodied in a particularly useful way. In the example shown in the figure, there are 4 pole pieces each of which has to be displaced by one-quarter of a pitch in relation to the neighbouring pole piece. These displacements can of course be obtained on basis of pole pieces each profile of which is individual, or which are adjustable in position; this complicates manufacturing and assembly problems respectively by making rotary guidance of the pole pieces necessary.

If, on the other hand, it is desired that the magnetic circuits of all the pole pieces should be identical, arranged in the same plane, and on the other hand that it should be possible for these circuits to be fixed on flat surfaces of the casing arranged symmetrically in relation to the axis of the movable component, there has to be an odd number of teeth (or channels) in the movable component and the angular span of a pole piece must at most be equal to 90° less the angle the chord of which is equal to one-quarter of a pitch.

We shall now consider a constructional variation which, in appearance, is similar to that in FIG. 2 but in which we will assume that the channels 6 inside the movable component 2 are obtained by forming a thread with a square profile. We thus have a helical set of teeth and if these are to cooperate satisfactory with the corresponding pole pieces 3, the teeth carried by the pole pieces will have to be inclined by a value equal to the angle of the helix.

If the coils of the pole pieces 3 are now permanently excited, the movable component 2 can only move in rotation.

Taking into account the fact that the teeth of the movable component always remain opposite the teeth of the pole pieces by magnetic effect, rotation of 2 will result in a helical movement comparable to that of a nut turning along a threaded rod. Thus, by means of two suitably-fed pulse generators, rapid linear movement of the movable component can be produced, corresponding e.g. to the travel selected to correspond to the heavy weights of a digital control system, simultaneously accompanied by a slight rotation whose amplitude (generally less than one turn) is decided taking into account the light weights of the control system.

This large/small positioning system thus has a low response time and good precision.

If, for example, the external diameter of the movable component is in the region of 32.6 mm, it will be possible to house a series of 64 teeth with a 1.6 mm pitch in it. By arranging inside a thread with a square-profile tooth and a pitch equal to 1.6 mm, a one-pitch rotation of the control component will cause an advance of 1.6 mm/64, i.e. 0.025 mm.

Since, moreover, a system with four pole pieces 3 makes it possible to advance by one-quarter of a pitch, an increment in the neighbourhood of 6 microns can be expected for the linear movements. This value is amply sufficient for the precise positioning or ordinary machine tool components.

It is clear that modifications could be made to the device in accordance with the invention, e.g. by placing the channels parallel to the axis inside a tubular element. The pole pieces of the type bearing the reference number 4 could then take the form shown in FIG. 4.

Moreover, fixing the movable component 2 on to the frame of a machine would make it stationary, which would cause the casing 1 to move in reverse direction. This variant would be useful if one wanted several components to be mechanically connected to the part of the actuator which moves.

I claim:

1. Actuator device having a movable component adapted for moving in rotation about an axis and in translation along said axis, said movable component being made of a magnetic material and having on a first portion of its surface a first series of elongated channels substantially perpendicular to the said axis and, on a second portion of its surface, a second series of elongated channels substantially parallel to the said axis, first and second sets of magnetic pole pieces respectively equipped with first and second sets of coils and comprising teeth whose pitch corresponds to that of the channels being arranged opposite said respective first and second surface portions and supply means for separately energizing said first and second sets of coils, said supply means being adapted for sequentially energizing the coils of each set and for simultaneously energizing the coils of each set.

2. Actuator device in accordance with claim 1, wherein said movable component is cylindrical, the two series of channels being arranged on the external surface of the said cylindrical movable component, on two portions of the said external surface in axial succession.

3. Actuator device in accordance with claim 1, wherein said movable component is cylindrical, the two series of channels being arranged on two portions of the external surface of the said cylindrical movable component in angular succession.

4. Actuator in accordance with claim 1, wherein the movable component is a cylindrical tube, the second series of channels being arranged on the external surface of the said tube, while the first series of channels is arranged on the inside surface of the said tube, and a guide member positioned inside the movable component, supporting the first set of magnetic pole pieces.

5. Actuator in accordance with claim 4, wherein the first series of channels is formed in a thread with a square profile and the teeth of the first set of pole pieces are inclined in relation to the axis of the cylindrical tube by a value equal to the angle of the helix.

* * * * *